US012154743B2

(12) United States Patent
Schmid et al.

(10) Patent No.: US 12,154,743 B2
(45) Date of Patent: Nov. 26, 2024

(54) DRIVE SYSTEM FOR A SWITCH, AND METHOD FOR DRIVING A SWITCH

(71) Applicant: Maschinenfabrik Reinhausen GmbH, Regensburg (DE)

(72) Inventors: Sebastian Schmid, Sinzing (DE); Juergen Schimbera, Regensburg (DE); Kathrin Pruessing, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 524 days.

(21) Appl. No.: 17/611,199

(22) PCT Filed: Apr. 23, 2020

(86) PCT No.: PCT/EP2020/061281

§ 371 (c)(1),
(2) Date: Nov. 15, 2021

(87) PCT Pub. No.: WO2020/229122

PCT Pub. Date: Nov. 19, 2020

(65) Prior Publication Data

US 2022/0262581 A1 Aug. 18, 2022

(30) Foreign Application Priority Data

May 15, 2019 (DE) ..................... 10 2019 112 717.3

(51) Int. Cl.

*H02P 1/00* (2006.01)
*H01H 3/26* (2006.01)
*H01H 9/00* (2006.01)
*H01F 21/12* (2006.01)

(52) U.S. Cl.

CPC ............ *H01H 9/0005* (2013.01); *H01H 3/26* (2013.01); *H01F 21/12* (2013.01)

(58) Field of Classification Search

CPC ........... G05B 2219/35585; G05B 2219/39246; H01H 9/0005; H01H 21/12; H01H 3/26

See application file for complete search history.

(56) References Cited

U.S. PATENT DOCUMENTS

| | | | |
|---|---|---|---|
| 6,713,984 | B1 | 3/2004 | Valdemarsson |
| 7,463,010 | B2 | 12/2008 | Dohnal et al. |
| 8,988,020 | B1 | 3/2015 | Rometo |

(Continued)

FOREIGN PATENT DOCUMENTS

| | | | | |
|---|---|---|---|---|
| AU | 2021421805 | A1 * | 8/2023 | ............... H01H 3/26 |
| CN | 109216058 | A | 1/2019 | |

(Continued)

*Primary Examiner* — Karen Masih

(74) *Attorney, Agent, or Firm* — LEYDIG VOIT & MAYER LTD.

(57) ABSTRACT

A drive system drives at least one switch. The drive system includes: a drive shaft, which is configured to connect the drive system to the at least one switch and at least one motor, which is configured to be coupled to the drive shaft; a feedback system which is configured to determine a position of the drive shaft and, based on this position, to generate a feedback signal; and a controller which, based on the feedback signal, selects a stored travel profile from a plurality of travel profiles and controls the motor in accordance with the selected travel profile.

18 Claims, 6 Drawing Sheets

(56) References Cited

U.S. PATENT DOCUMENTS

| | | | |
|---|---|---|---|
| 10,502,615 | B2 | 12/2019 | Ueda |
| 2013/0206555 | A1 | 8/2013 | Donhauser et al. |
| 2015/0061806 | A1 | 3/2015 | Teising et al. |
| 2015/0171783 | A1 | 6/2015 | Kammerl et al. |

FOREIGN PATENT DOCUMENTS

| | | | | | |
|---|---|---|---|---|---|
| DE | 4004671 | C1 | | 9/1991 | |
| DE | 69830808 | T2 | | 4/2006 | |
| DE | 202010011521 | U1 | | 11/2011 | |
| DE | 102019112715 | B3 | * | 10/2020 | ............. H01F 29/04 |
| EP | 1884965 | A1 | * | 2/2008 | ............. H01F 29/04 |
| JP | 2004/344946 | A | | 12/2004 | |
| RU | 2638037 | C2 | | 12/2017 | |
| WO | WO-0036621 | A1 | * | 6/2000 | ............. H01H 33/36 |
| WO | WO-2012135209 | A1 | * | 10/2012 | ............. H01F 29/04 |
| WO | WO 2018/012123 | A1 | | 1/2018 | |

* cited by examiner

DRIVE SYSTEM FOR A SWITCH, AND METHOD FOR DRIVING A SWITCH

CROSS REFERENCE TO RELATED APPLICATIONS

This application is a U.S. National Phase application under 35 U.S.C. § 371 of International Application No. PCT/EP2020/061281, filed on Apr. 23, 2020, and claims benefit to German Patent Application No. DE 10 2019 112 717.3, filed on May 15, 2019. The International Application was published in German on Nov. 19, 2020 as WO 2020/229122 A1 under PCT Article 21(2).

FIELD

The invention relates to a drive system for a switch and to a method for driving a switch.

BACKGROUND

For controlling voltage in different transformers, a variety of switches exists for different tasks and with different requirements. To operate the various switches, they must be driven via a drive system. These switches are, for example, on-load tap-changers, diverter switches, selectors, double reversing change-over selectors, reversing change-over selectors, or change-over selectors.

A drive for one of the above-mentioned switches is discussed, for example, in DE 20 2010 011 521 U1. A motor is arranged in this on-load tap-changer drive and is rigidly connected to the corresponding on-load tap-changers via linkages. The motor is actuated by means of hard wiring, i.e., the motor is switched on or off by actuation of motor contactors. The on-load tap-changers are then actuated via the drive shaft. Once assembled and put into operation, it is not possible to make functional changes to the drive. This makes the drive rigid and inflexible. The simplest adjustments require complex conversion measures.

SUMMARY

In an embodiment, the present disclosure provides a drive system that drives at least one switch. The drive system includes: a drive shaft, which is configured to connect the drive system to the at least one switch and at least one motor, which is configured to be coupled to the drive shaft; a feedback system which is configured to determine a position of the drive shaft and, based on this position, to generate a feedback signal; and a controller which, based on the feedback signal, selects a stored travel profile from a plurality of travel profiles and controls the motor in accordance with the selected travel profile.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
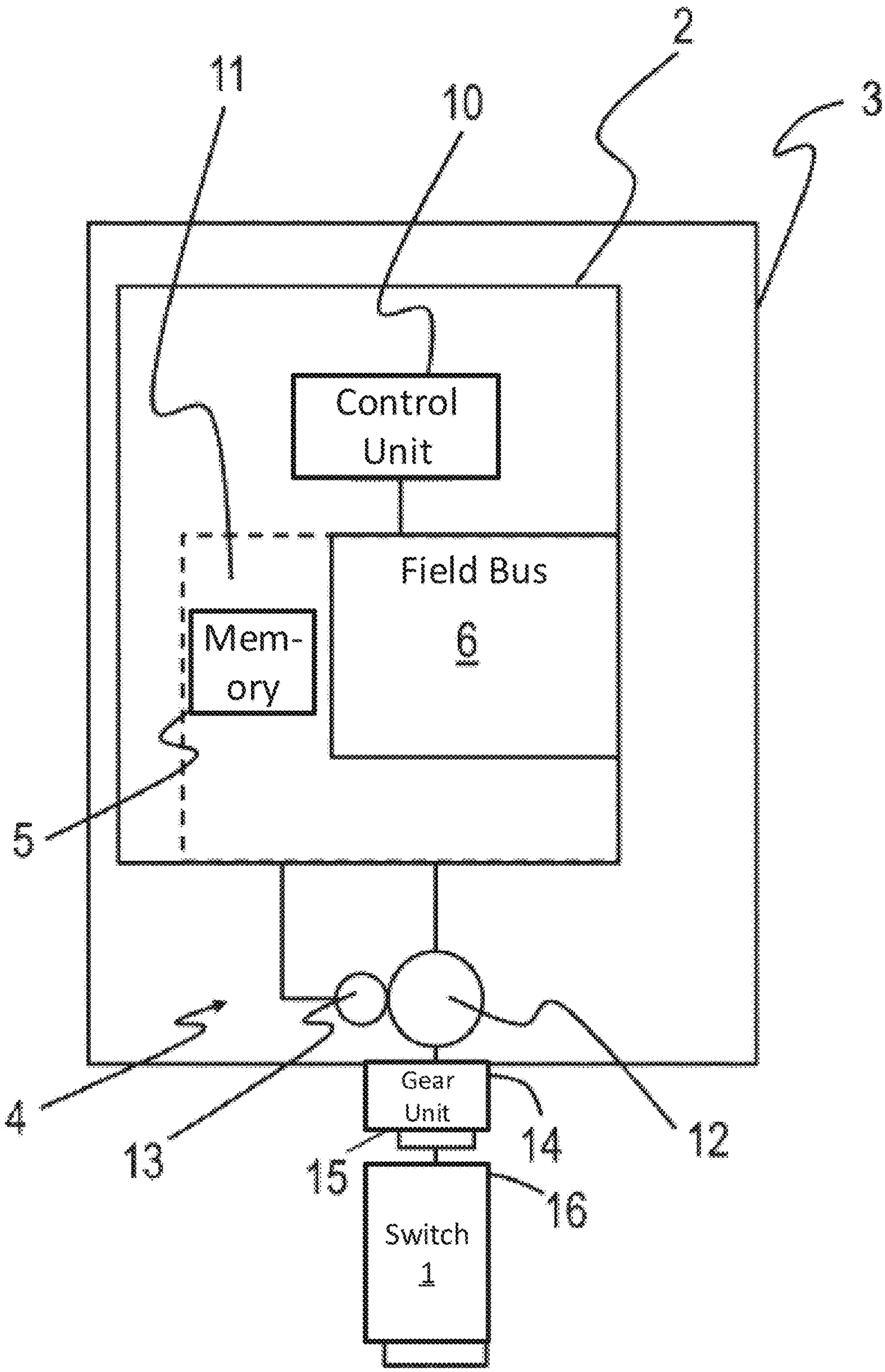
FIG. 1 a schematic representation of an exemplary embodiment of a drive system according to the improved concept.

Embodiments of the present invention provide an improved concept for driving a switch, in particular an on-load tap-changer, diverter switch, selector, double reversing change-over selector, reversing change-over selector, or change-over selector, by means of which the flexibility of the drive and the safety during the switching operation are increased.

Embodiments of the present invention provide a method for driving at least one switch, which method provides an improved concept for driving a switch, by which the flexibility of the drive and the safety during the switching are increased.

The drive system according to embodiments of the invention is suitable for at least one switch and comprises a drive shaft which connects the drive system to the at least one switch. At least one motor is provided which is coupled to the drive shaft. A feedback system is provided which is configured to determine a position of the drive shaft. A feedback signal is generated on the basis of this position. A control device is configured so that, depending on the feedback signal, a stored travel profile is selected from a plurality of travel profiles. The selected travel profile acts on the motor accordingly.

The control device comprises a control unit and a power section, wherein the power section is used to supply power to the at least one motor. The stored travel profiles are saved in a memory of the power section. Alternatively, the travel profiles are saved in a memory of the control device or the control unit.

According to an exemplary embodiment of the invention, the feedback system comprises at least one absolute encoder which is configured and arranged to detect an absolute position of the drive shaft or an absolute position of a further shaft connected to the drive shaft. On the basis of the detected position, at least one output signal can be generated which is configured to determine the position of the drive shaft on the basis of the at least one output signal.

The absolute encoder can be designed as a multi-turn or single-turn encoder.

According to an exemplary embodiment of the invention, the absolute encoder can be configured to detect the position of the drive shaft or the position of the further shaft on the basis of a first sampling method. The sampling method can be an optical, a magnetic, a capacitive or an inductive sampling method.

According to one embodiment of the invention, the feedback system may include at least one absolute encoder and an auxiliary contact which, in combination with the absolute encoder, is configured and arranged to detect an absolute position of the drive shaft or an absolute position of a further shaft. The further shaft is connected to the drive shaft. Based on the detected position, at least one output signal is generated. The position of the drive shaft is determined on the basis of the at least one output signal.

The absolute encoder can be embodied as a single-turn encoder or incremental encoder or virtual encoder. The auxiliary switch can be embodied as at least one micro-switch or resolver.

The travel profile is defined by two variables and represented as an nth-order polynomial function in a two-dimensional Cartesian coordinate system.

According to a further embodiment of the invention, the drive system can be designed such that the control device acts on two motors. The control device comprises at least one, optionally two power sections, wherein each motor cooperates with a common power section or each motor cooperates with its own power section.

According to embodiments of the invention, the control device is designed so as to cooperate with one of the two motors. This motor runs the travel profile of the actual value of the feedback system of the other motor.

The method according to an embodiment of the invention for driving at least one switch is characterized in that a drive system has a drive shaft connected to at least one motor. First of all, before the switchover is started, a travel profile is selected which describes an operation of the drive system for switching over from a current switch position to a reachable switch position. During the operation of the drive system, a position of the drive shaft of the at least one motor is detected with a feedback system. A feedback signal is generated from the detected actual value of the position of the drive shaft. A comparison of the actual value of the position of the drive shaft with the travel profile is used to determine whether there is a deviation between the actual value and the travel profile. If there is a deviation, the at least one motor is controlled in such a way that the deviation of the actual value from the travel profile is minimized. The drive system stops when the reachable switch position is reached.

An exemplary advantage of the method according to embodiments of the invention is that, by using the travel profiles, a high degree of flexibility and variability can be achieved during the switchover in a switch. Mechanical changes in the switch that can influence the switchover are absorbed by the use of the travel profiles; it is thus possible to adapt the travel profiles accordingly.

At least one travel profile is determined for the drive shaft to drive the switch. Typically, a plurality of travel profiles are determined for a switch. The at least one and determined travel profile is stored for use in a switching operation.

An absolute position of the drive shaft or an absolute position of a further shaft is determined with at least one absolute encoder of the feedback system. Based on the detected position, at least one output signal is generated here, with which the position of the drive shaft is determined.

A control device comprises a control unit and/or a power section with which the at least one motor is open-loop- or closed-loop-controlled in such a way that the switch position to be achieved by the travel profile is reached within a time specified by the travel profile.

Each of the travel profiles is defined by two variables and represents a two-dimensional nth-order polynomial function. The polynomial function is represented in a two-dimensional Cartesian coordinate system.

A speed or torque of the at least one motor is specified by the travel profile. Here, the travel profile also specifies at which point in time or at which position of the drive shaft, which torque or which speed is implemented by the motor at the drive shaft.

The improved concept is based, inter alia, on the idea of equipping a drive system for driving a switch with a feedback system and a control device, thereby enabling the switch to be actuated via a specific travel profile. Typically, for example, an on-load tap-changer is actuated such that a constant-speed motor actuates a drive shaft that moves selector contacts in parallel and winds up a spring energy accumulator that, once tripped, acts on the load tap changer. The drive system according to the improved concept is able to drive the drive shaft in a targeted manner, i.e., according to a previously selected travel profile. The travel profile not only specifies a speed or torque. The travel profile also specifies at which point in time or at which position of the drive shaft, which torque or which speed is implemented at the drive shaft. By using such travel profiles, specific sections of a switching operation of the switch can be influenced. For example, it is possible to increase the speed or torque on the basis of the drive shaft position. Since different parts to be actuated are arranged in the switch on the drive shaft, these can be explicitly protected. For example, at the beginning of a switchover, a higher torque is required to release contacts or set them in motion. Immediately afterwards, the torque can be reduced. This can be achieved explicitly with the travel profile. The feedback signal is used to compare the current position of the drive shaft, i.e., the actual value, with the travel profile, i.e., the desired value. This makes the system flexible and safe.

The concept of the "drive shaft position" includes measurement variables from which the position of the drive shaft can be unambiguously determined, if necessary within a tolerance range.

According to at least one embodiment, the drive system serves to drive a shaft of the switch, on-load tap-changer or a corresponding component of the on-load tap-changer. This causes the on-load tap-changer to carry out one or more operations, for example, a switchover between two winding taps of an item of equipment or parts of the switchover, such as a diverter switch operation, a selector actuation or a change-over selector actuation.

According to at least one embodiment, the drive shaft is connected directly or indirectly, in particular via one or more gear units, to the switch, in particular to the shaft of the switch.

According to at least one embodiment, the drive shaft is connected directly or indirectly, in particular via one or more gear units, to the on-load tap-changer, in particular to the shaft of the on-load tap-changer.

According to at least one embodiment, the drive shaft is connected directly or indirectly, in particular via one or more gears, to the motor, in particular to a motor shaft of the motor.

According to at least one embodiment, a position, in particular an absolute position, of the motor shaft corresponds to a position of the drive shaft. This means that the position of the drive shaft can be unambiguously deduced from the position of the motor shaft, if necessary within a tolerance range.

According to at least one embodiment, the action includes open-loop control, closed-loop control, braking, acceleration, or stopping of the motor. For example, the closed-loop control may include position control, speed control, acceleration control, or torque control. At least in the case of such closed-loop controls, the drive system can be said to be a servo drive system.

According to at least one embodiment, the drive system comprises a monitoring unit, which is configured to monitor the one or more operations of the switch on the basis of the feedback signal. The monitoring comprises in particular a monitoring as to whether individual operations or parts thereof are carried out properly, in particular within predefined time windows.

According to at least one embodiment the control device comprises a control unit and a power section for open-loop-controlled or closed-loop-controlled power supply of the motor. The control unit is configured to control the power section. At least one travel profile is saved in the power section, which travel profile is formed from two variables and can be represented as an nth-order polynomial function in a two-dimensional Cartesian coordinate system.

According to at least one embodiment, the power section is designed as a converter or servo converter or as an equivalent electronic, in particular fully electronic, unit for drive machines.

According to various embodiments, the control device contains all or part of the feedback system.

The absolute position of the drive shaft can be compared by the control device, for example. If there is a significant deviation, the control device can output an error message or initiate a safety measure.

According to at least one embodiment, the feedback system is configured to determine a rotor position of the motor and to determine a value for the position of the drive shaft, depending on the rotor position.

According to at least one embodiment, the rotor position is an angular range in which a rotor of the motor is located, optionally combined with a number of complete rotations of the rotor.

Depending on the design, in particular the number of pole pairs, of the rotor, the position or absolute position of the motor shaft can thus be determined accurately to at least 180°, for example by the control device. By the reduction by means of one or more gear units the achievable accuracy of the position of the drive shaft is significantly greater. In this case, the evaluation by the control device corresponds to a virtual encoder function, so to speak. Even in the event of a complete failure of an absolute encoder of the feedback system, at least one emergency operation can therefore be maintained and/or the on-load tap-changer can be brought into a safe position.

According to at least one embodiment, the feedback system includes an absolute encoder configured and arranged to detect the absolute position of the drive shaft or an absolute position of a further shaft connected to the drive shaft and to generate at least one output signal based on the detected position. The feedback system is configured to determine a value for the position of the drive shaft on the basis of the at least one output signal.

According to at least one embodiment, the absolute encoder is directly or indirectly attached to the motor shaft, the drive shaft, or a shaft coupled thereto.

According to at least one embodiment, the absolute encoder comprises a multi-turn encoder or single-turn encoder.

According to at least one embodiment, the absolute encoder is configured to detect the position of the drive shaft or the position of the further shaft on the basis of a sampling method.

According to at least one embodiment, the sampling method includes an optical, a magnetic, a capacitive, a resistive, or an inductive sampling method.

According to at least one embodiment, the feedback system includes a combination of an encoder and an auxiliary contact, which in the combination are configured and arranged to detect the absolute position of the drive shaft or an absolute position of a further shaft connected to the drive shaft and to generate at least one output signal based on the detected position. The feedback system is configured to determine a value for the position of the drive shaft on the basis of the at least one output signal.

According to at least one embodiment, the encoder and the auxiliary contact are directly or indirectly attached to the motor shaft, the drive shaft, or a shaft coupled thereto.

According to at least one embodiment, the encoder is designed as a single-turn encoder or incremental encoder or virtual encoder, and the auxiliary switch is designed as at least one microswitch or resolver or sin-cos encoder.

According to at least one embodiment, the encoder and the auxiliary contact are configured to detect the position of the drive shaft or the position of the further shaft on the basis of a sampling method.

According to at least one embodiment, the travel profile can be formed from two variables and represented as an nth-order polynomial function in a two-dimensional Cartesian coordinate system.

According to at least one embodiment, the variables are direct variables or indirect variables of the drive system, for example, time, angle of rotation of the drive shaft, current, voltage, speed, torque, or acceleration.

According to at least one embodiment, a variable can be represented by in each case one axis of the coordinate system.

According to at least one embodiment, the control device can act on a second motor.

According to at least one embodiment, the control device can comprise a second power section which acts on a second motor.

According to at least one embodiment, the control device can act on a second motor in such a way that it runs the travel profile of the actual value of the feedback system of the first motor.

According to at least one embodiment, the switch can be an on-load tap-changer or a diverter switch or a selector or a double reversing change-over selector or a reversing change-over selector or a change-over selector.

According to the improved concept, a method for driving a switch is also disclosed. The method comprises determining and selecting a travel profile for the drive shaft for driving the switch by the control device, generating a feedback signal based on the position of the drive shaft, and controlling a motor for driving the switch depending on the feedback signal and the travel profile.

In the following, the invention is explained in detail on the basis of exemplary embodiments with reference to the drawings. Components which are identical or functionally identical or which have an identical effect may be provided with identical reference signs. Identical components or components having an identical function may in some cases be explained only in relation to the figure in which they first appear. The explanation is not necessarily repeated in the subsequent figures.

The figures merely illustrate exemplary embodiments of the invention without, however, limiting the invention to the illustrated exemplary embodiments.

FIG. 1 shows a schematic representation of an exemplary embodiment of a drive system 3 for a switch 1. The drive system 3 is connected to the switch 1 via a drive shaft 16. The drive system 3 includes a motor 12, which can drive the drive shaft 16 via a motor shaft 14 and, optionally, via a gear unit 15. A control device 2 of the drive system 3 comprises a power section 11, which contains for example a converter, for the open-loop- or closed-loop-controlled power supply of the motor 12, and a control unit 10 for controlling the power section 11, for example via a bus. The drive system 3 comprises an encoder system 13, which serves as a feedback system 4, or is a part of the feedback system 4, and is connected to the power section 11. Furthermore, the encoder system 13 is directly or indirectly coupled to the drive shaft 16.

The encoder system 13 is configured to detect at least a first value for a position, in particular an angular position, for example an absolute angular position, of the drive shaft 16. For this purpose, the encoder system 13 can comprise, for example, an absolute encoder, in particular a multi-turn absolute encoder, which is attached to the drive shaft 16, the motor shaft 14 or another shaft of which the position is unambiguously linked to the absolute position of the drive shaft 16. However, the encoder system 13 can also comprise a single-turn absolute encoder and/or a virtual encoder and/or auxiliary switches. For example, the position of the drive shaft 16 can be unambiguously determined from the position of the motor shaft 14, for example via a transmission ratio of the gear unit.

The feedback system 4 is configured to detect a value for the position of the drive shaft 16.

The control device 2 and in particular the control unit 10 and/or the power section 11 are designed to control the motor 12 in an open-loop or closed-loop fashion depending on a feedback signal based on the value generated by the feedback system 4.

The power section 11 has a memory 5 with stored travel profiles 22. The encoder system 13, which is used as feedback system 4, reports the position of the shaft to the power section 11 and thus monitors whether the drive shaft 16 is moving correctly along the travel profile 22 or is adhering to the specified parameters. The travel profiles 22 may also be stored in the control device 2 or control unit.

A plurality of travel profiles 22 are stored in the power section 11. One of the travel profiles 22 is selected via the control unit 10.

Figure 2A:
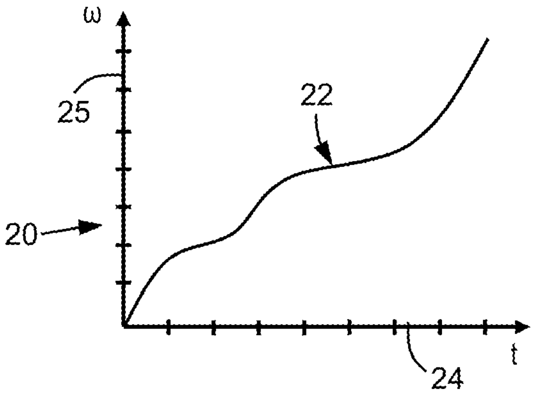
FIG. 2*a* a travel profile for the drive system showing the angle of rotation of the drive shaft as a function of time.

FIG. 2*a* shows a possible travel profile 22 of the motor 12 for a switching operation of the switch 1. The exemplary travel profile 22 is an n-th order polynomial function with two variables, which are plotted in a two-dimensional Cartesian coordinate system 20. In the case of the travel profile 22 shown in FIG. 2*a*, the time t, i.e., how long the drive shaft 16 actuates the motor 12, is plotted on the X-axis 24. On the Y-axis 25, the angle of rotation w of the drive shaft 16 is plotted. The variables plotted on axes 24, 25 in FIG. 2*a* are examples only and should not be construed as limitations of the invention. The variables plotted on the X-axis 24 and the Y-axis 25 may be direct variables or indirect variables of the drive system 3. Direct variables may be, for example, the time t, an angle of rotation of the drive shaft 16, current or voltage. Indirect variables may be speed, torque, acceleration or the like.

Figure 2B:
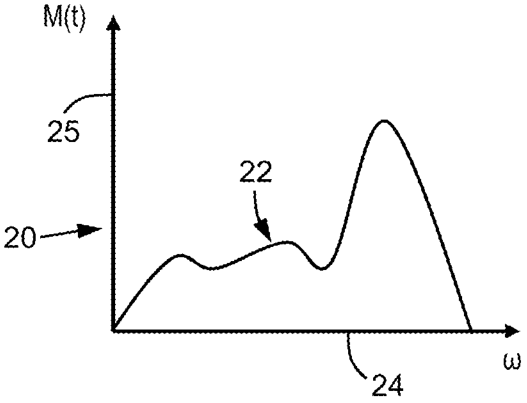
FIG. 2*b* a travel profile for the drive system which shows the torque as a function of the angle of rotation of the drive shaft.

FIG. 2*b* shows a possible travel profile 22 of the motor 12 for a switching operation of the switch 1, which is plotted in a two-dimensional Cartesian coordinate system 20. Here, the indirect variable of torque M(t) is plotted as a function of the angle of rotation w and shown as an nth-order polynomial function. In the travel profile 22 shown in FIG. 2*a*, the angle of rotation w is plotted on the X-axis 24. The torque M(t) acting on the drive shaft 16 is plotted on the Y-axis 25.

The travel profile 22 specifies a desired value which the drive shaft 16 should achieve. When the travel profile 22 is run, the actual value detected by the feedback system 4 can deviate from the desired value. Depending on the predetermined possible deviation of the actual value from the desired value the action on the motor 12 can either be aborted or continued. The deviation can either be set manually or determined by means of a learning process.

Figure 3:
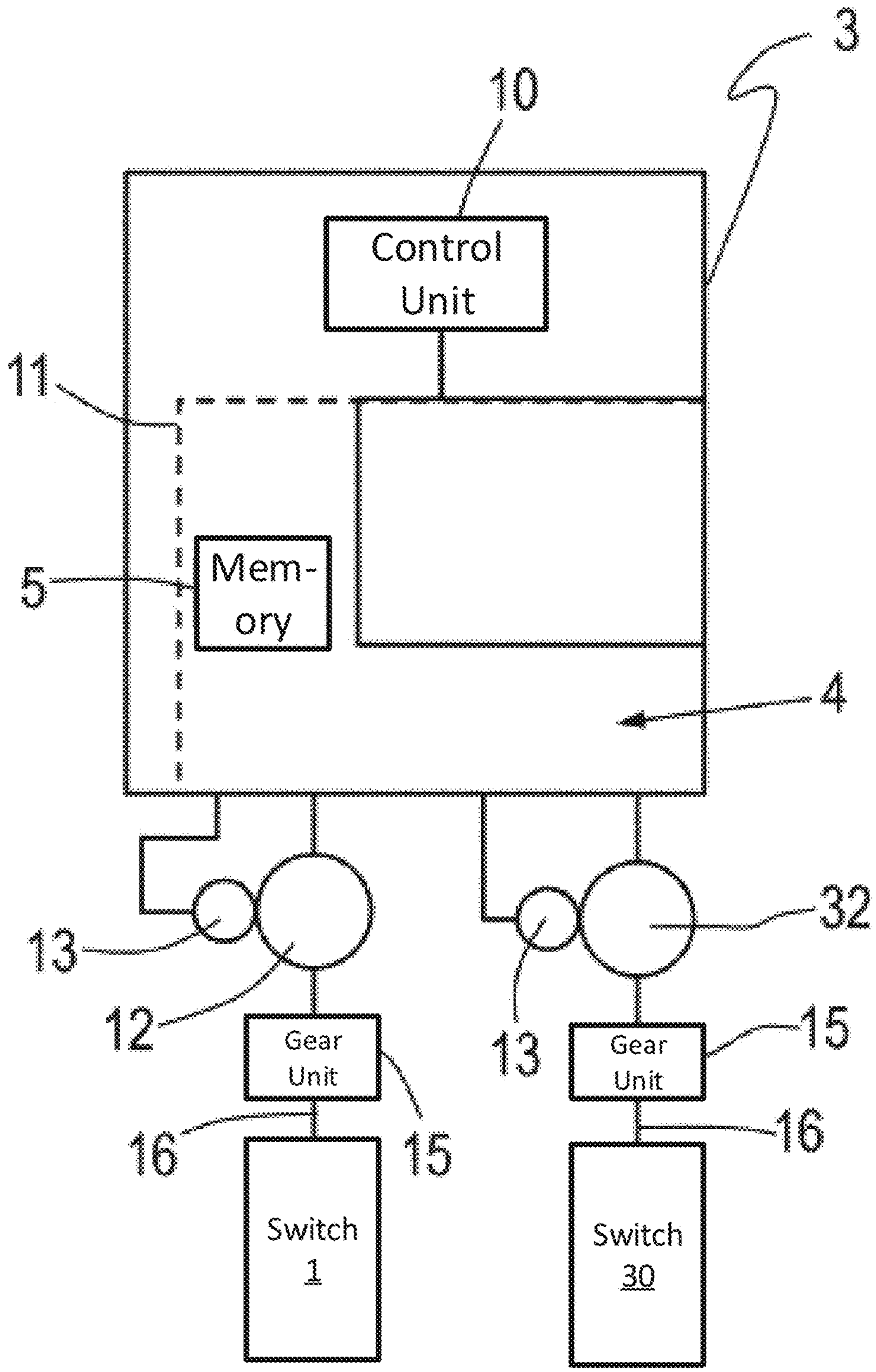
FIG. 3 another schematic representation of an exemplary embodiment of a drive system, according to the improved concept for multiple switches.

FIG. 3 shows the drive system 3, which drives two switches 1, 30. The second encoder system 13, which is also used as feedback system 4, likewise reports the position of the second drive shaft 16 to the power section 11, or the power section 11 queries the position, and thus monitors whether the second drive shaft 16 is moving correctly along the travel profile 22 or is adhering to the specified parameters. In doing so, the two motors 12, 32 can either follow the predetermined travel profile 22 or one of the motors 12 runs the predetermined travel profile 22 and the second motor 32 follows the actual value of the first motor 12, i.e., in a kind of "master-slave" function. The second motor 32 receives the data for this from the power section 11. This ensures that both switches 1, 30 run the same travel profile 22 in the same time t with only a slight time delay. If both have to run the same travel profile 22 independently of each other, in the event of a malfunction or delay in one of the switches 1, 30, the second switch can finish faster, so that there is no synchronous driving and thus no synchronous switching. However, this may be exactly what is necessary in some cases. Safe parallel operation can be ensured by the "master-slave" operation.

Figure 4:
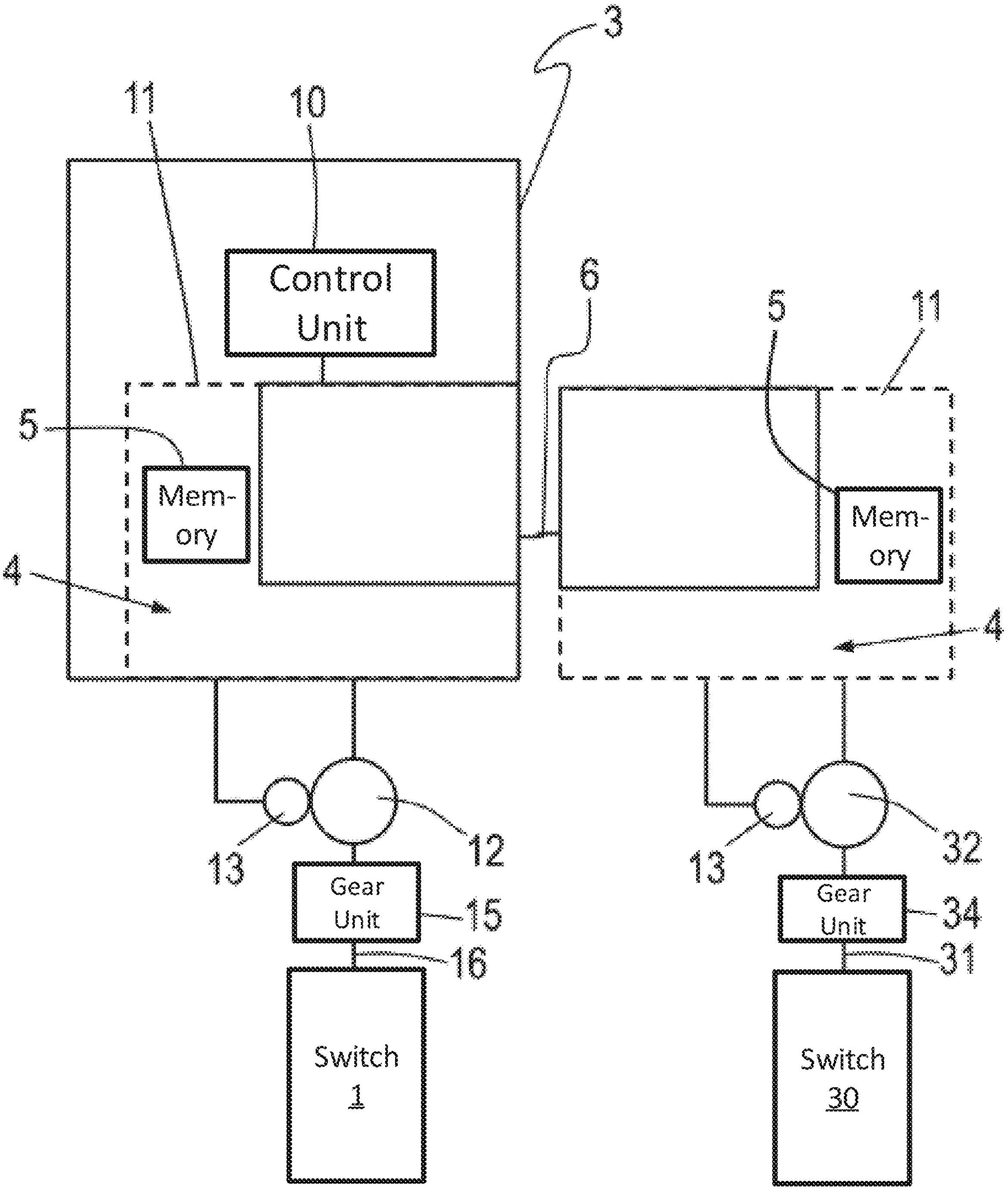
FIG. 4 a schematic representation of an exemplary embodiment of a drive system according to the improved concept with multiple power sections.

FIG. 4 shows an embodiment of the drive system 3 in which a second power section 40 with a separate motor 32 and a feedback system 4 are provided. Here, too, the two motors 12, 32 can either follow the predefined travel profile 22 or one motor 12 follows the travel profile 22 and the second motor 32 follows the actual value of the first motor 12 provided by the first feedback system 4, i.e. in a kind of "master-slave" function. This advantageous embodiment allows parallel operation of a plurality of switches which are spatially far away from each other. The power sections 11, 40 are connected to each other with a field bus 6, such as a Powerlink. Only data exchange takes place and no power transmission. Furthermore, it can be advantageous for economic reasons to use several smaller power sections instead of one large power section.

Figure 5:
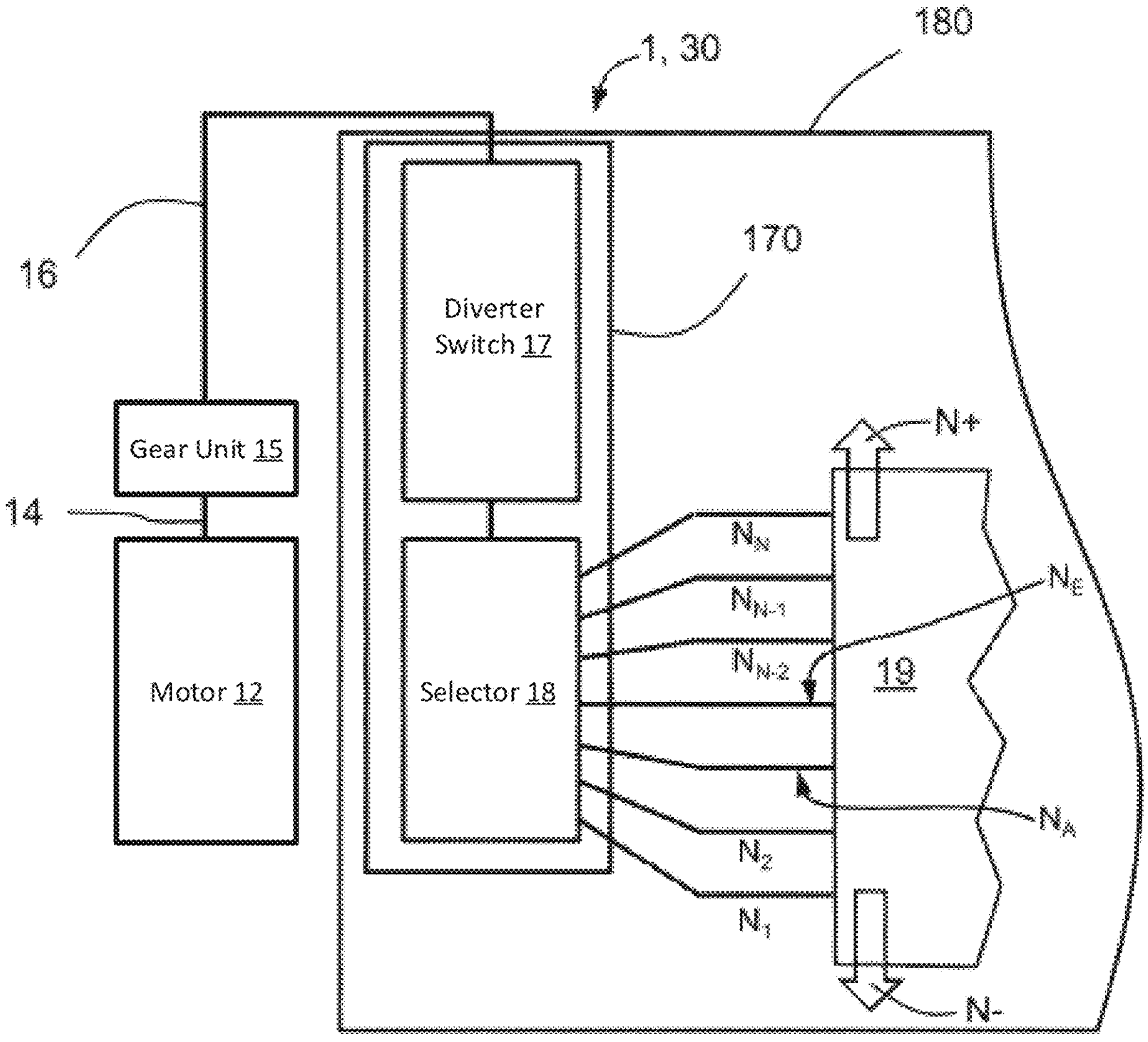
FIG. 5 a schematic representation of the drive for an on-load tap-changer, which can be used to switch between the different taps (switch positions) of a transformer.

FIG. 5 shows a schematic design of a drive concept of a switch 1, 30, which is formed as a on-load tap-changer 170. In this switch, the switch positions $N_1, N_2, \ldots, N_N$ can be approached and are connected to the various taps of a tap winding 19 of a transformer 180. Although the concept of an on-load tap-changer 170 has been chosen for the description of the individual switch positions $N_1, N_2, \ldots, N_N$ of the switch 1, 30, this is not to be understood as a limitation of the invention. It is self-evident to a person skilled in the art that the drive concept also applies for on-load tap-changers, selectors, double reversing change-over selectors, reversing change-over selectors or change-over selectors.

A motor 12 is provided for driving a selector 18 and the diverter switch 17, which motor acts on the on-load tap-changer 170 with the selector 18 and the diverter switch 17 via a gear unit 15. Via a motor shaft 14 and a drive shaft 16, the motor 12 acts on the on-load tap-changer 170 to switch in an upward direction N+from a switching position $N_N$ to the next higher switching position $N_{N+1}$ or in a downward direction N− from a switching $N_N$ to the next lower switching position $N_{N-1}$. The selector is used here to preselect the switching position (tap position) to be switched and the diverter switch performs the actual diverter switch operation.

Figure 6:
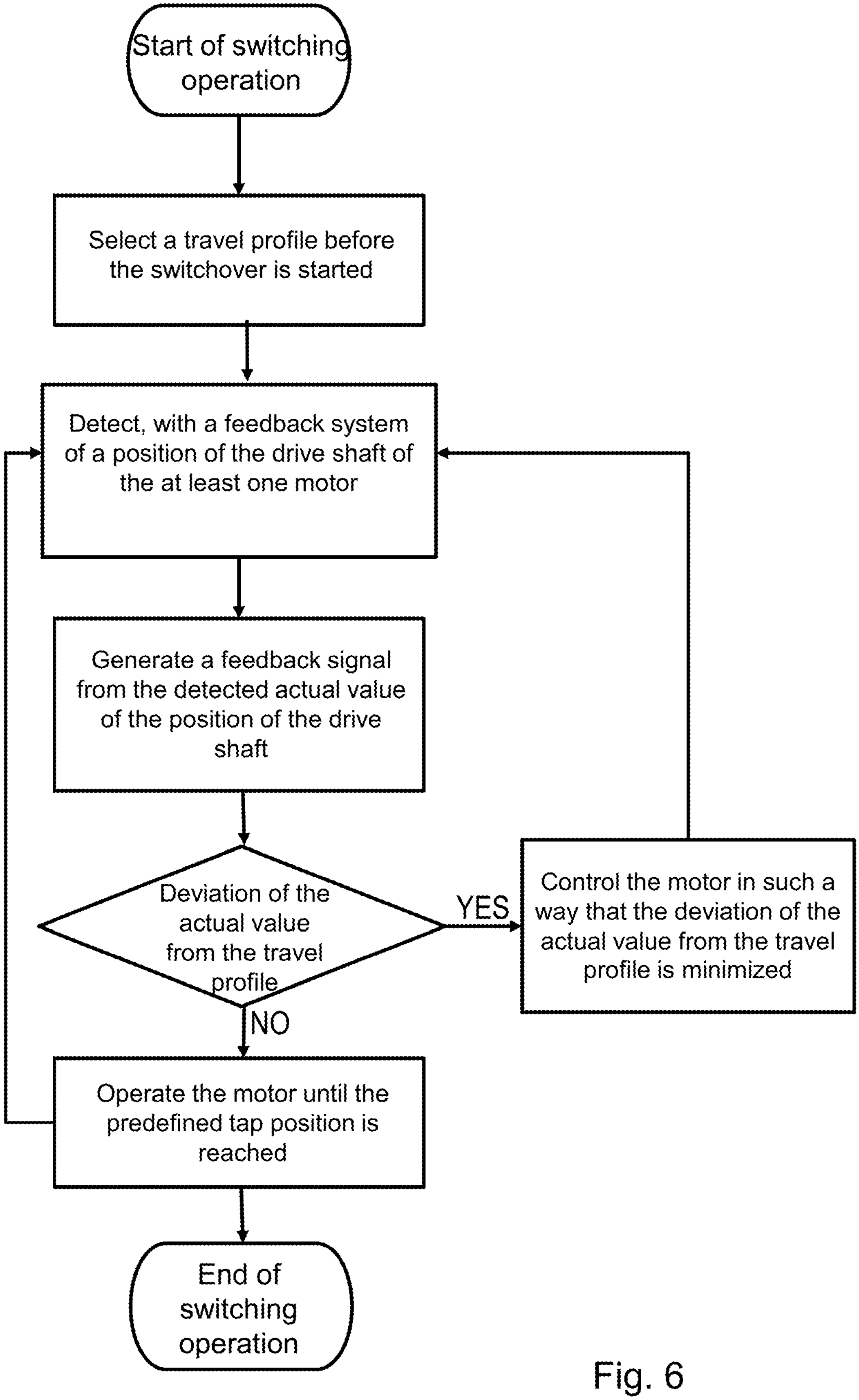
FIG. 6 a schematic representation of a flowchart of the method according to the invention for driving a switch.

FIG. 6 shows a flow chart of the method according to an embodiment of the invention for driving at least one switch 1, 30. The at least one switch 1, 30 comprises at least one drive system 3, which has a drive shaft 16 connected to at least one motor 12. The switching from a current switching position $N_A$ (see FIG. 5) to a reachable switching position $N_E$ (see FIG. 5) can be described with a travel profile 22, which can be described and/or represented by an nth-order polynomial. The switching can take place both in the upward direction N+ and in a downward direction N−. Before the switching operation is started, a travel profile 22 is selected which describes an operation of the drive system 3 for switching over from the current tap position $N_A$ to the reachable switching position $N_E$. During the operation of the drive system 3, a position of the drive shaft 16 of the at least one motor 1, 30 is detected with a feedback system 4. The detected position of the drive shaft 16 is defined by an actual value of the position of the drive shaft 16. A feedback signal is generated from the detected actual value of the position of the drive shaft 16.

The selected travel profile 22 represents a desired value (a series of desired values) that the drive system 3 should reach in order to accomplish the switch from the current switching position $N_A$ to the switching position $N_E$ to be reached, e.g. in the predetermined time. According to the invention, a comparison of the actual value of the position of the drive shaft 16 with travel profile 22 (desired value) is performed, ideally in real time or slightly delayed. From the comparison, it can be determined whether there is a deviation between the actual value and the travel profile 22.

If there is a deviation between the actual value and the travel profile 22, a control device 2 intervenes to control the at least one motor 12 in such a way that the deviation of the actual value from the travel profile 22 is minimized. While the travel profile is being run, the comparison between the actual value and the travel profile 22 (desired value) is performed continuously. If a deviation is detected, the control device 2 counteracts accordingly (e.g. increase/decrease torque of the motor 12; increase/decrease speed of the motor 12, etc.). When the reachable shift position $N_E$ is reached, the drive system 3 stops. A further switching operation can then be initiated, if necessary, with a different travel profile 22. If the deviation rises above a certain level, which was defined beforehand, the switchover can be aborted. Then, either the entire system is stopped, or the drive shaft and thus the switch are moved back to a defined safe position and returned to the start position. For this purpose, the travel profile 22 selected at the beginning can be run backwards or another travel profile can be selected and run by the control device 2 or control unit 10.

The travel profiles are determined for the particular switch with which the drive shaft 16 is to be driven with the motor in an ideal manner. The at least one and determined travel profile is stored for use in a switching operation. A corresponding storage device can be provided for this purpose.

An absolute position of the drive shaft 16 or an absolute position of a further shaft is determined with at least one encoder system 13 of the feedback system 4.

The control device 2 comprises a control unit 10 and/or a power section 11, with which the at least one motor 12 is open-loop- or closed-loop-controlled in such a way that the tap position $N_E$ to be reached by the travel profile 22 is reached within a time predetermined by the travel profile 22 and the tap position $N_E$ to be reached is reached approximately with the predefined travel profile 22.

The travel profile 22 specifies, for example, a speed or a torque of the at least one motor 13. The travel profile 22 thus specifies at which point in time or at which position of the drive shaft 16, which torque or which speed is to be implemented by the motor 13 at the drive shaft 16. The control device is now used to control the motor 13 accordingly so that the specifications of the travel profile 22 are implemented.

The invention has been described under consideration of exemplary embodiment. It is self-evident to a person skilled in the art that changes and modifications can be made without departing from the scope of protection of the claims hereinafter.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1, 30 Switch
2 Control device
3 Drive system
4 Feedback system
5 Memory
6 Fieldbus
10 Control unit
11, 40 Power section
12 Motor
13, 32 Encoder system
14 Motor shaft
15, 34 Gear unit
16, 31 Drive shaft
170 On-load tap-changer
17 Diverter switch
18 Selector
19 Tap winding
20 Coordinate system

22 Travel profile
24 X-axis
25 Y-axis
$N_o, N_2, \ldots, N_N$ Tap position
N+Upward direction
N− Downward direction
$N_A$ Current tap position
$N_E$ Reachable tap position
t Time
ω Angle of rotation
M(t) Torque

The invention claimed is:

1. A drive system for at least one switch, the drive system comprising:

a drive shaft, which is configured to connect the drive system to the at least one switch and at least one motor, which is configured to be coupled to the drive shaft;

a feedback system which is configured to determine a position of the drive shaft and, based on this position, to generate a feedback signal, wherein the feedback system comprises at least one encoder system and an auxiliary contact, which in combination are configured and arranged to detect an absolute position of the drive shaft or an absolute position of a further shaft connected to the drive shaft and to generate at least one output signal based on the detected position, and is configured to determine the position of the drive shaft on the basis of the at least one output signal; and a controller which, based on the feedback signal, selects a stored travel profile from a plurality of travel profiles and controls the motor in accordance with the selected travel profile.

2. The drive system as claimed in claim 1, wherein the controller comprises a control unit and a power section, wherein the power section is used to supply power to the at least one motor and the stored travel profiles are saved in a memory of the power section.

3. The drive system as claimed in claim 1, wherein the feedback system comprises at least one encoder system, which is configured and arranged to detect an absolute position of the drive shaft or an absolute position of a further shaft which is connected to the drive shaft, wherein, on the basis of the detected absolute position, at least one output signal configured to be generated, with which the position of the drive shaft is determinable.

4. The drive system as claimed in claim 3, wherein the encoder system comprises an absolute encoder which is configured as a multi-turn encoder or single-turn encoder.

5. The drive system as claimed in claim 3, wherein the encoder system is configured to detect the position of the drive shaft or the position of the further shaft based on a first sampling method.

6. The drive system as claimed in claim 5, wherein the sampling method comprises an optical, a magnetic, a capacitive, or an inductive sampling method.

7. The drive system as claimed in claim 1, wherein the encoder system is formed as an absolute encoder, which is embodied as a single-turn encoder or incremental encoder or virtual encoder and the auxiliary contact is embodied as at least one microswitch or resolver.

8. The drive system as claimed in claim 1, wherein the travel profile is defined by two variables and is represented as an nth-order polynomial function in a two-dimensional Cartesian coordinate system.

9. The drive system as claimed in claim 1, wherein the controller acts on two motors.

10. The drive system as claimed in claim 9, wherein the controller comprises two power sections, wherein these cooperate with one each of the two motors.

11. The drive system as claimed in claim 9, wherein the controller cooperates with one of the two motors in such a way that the latter runs the travel profile of the actual value of the feedback system of the other motor.

12. The drive system as claimed in claim 1, wherein the switch is an on-load tap-changer or a diverter switch or selector or a double reversing change-over selector or a reversing change-over selector or a change-over selector.

13. A method for driving at least one switch with a drive system, which has a drive shaft connected to at least one motor, the method comprising:

before a switchover is started, a travel profile is selected that describes an operation of the drive system for switching over from a current switch position to a reachable switch position;

during the operation of the drive system, a position of the drive shaft of the at least one motor is detected with a feedback system, wherein the detected position of the drive shaft defines an actual value of the position of the drive shaft;

a feedback signal is generated from the actual value of the position of the drive shaft, wherein the feedback system determines the position of the drive shaft based on the feedback signal;

a comparison of the actual value of the position of the drive shaft with the travel profile is used to determine whether there is a deviation between the actual value and the travel profile;

upon determining that a deviation is present, the at least one motor is controlled in such a way that the deviation of the actual value from the travel profile is minimized; and upon the reachable switch position being reached, the drive system stops.

14. The method as claimed in claim 13, wherein at least one travel profile is determined for the drive shaft for driving the switch and the at least one and determined travel profile is stored for use in a switching operation.

15. The method as claimed in claim 13, wherein an absolute position of the drive shaft or an absolute position of a further shaft is determined with at least one encoder system of the feedback system.

16. The method as claimed in claim 13, wherein a controller comprises a control unit or a power section, with which the at least one motor is open-loop-or closed-loop-controlled in such a way that the tap position to be reached by the travel profile is reached within a time predetermined by the travel profile.

17. The method as claimed in claim 13, wherein the travel profile is defined by two variables and constitutes a two-dimensional nth-order polynomial function represented in a two-dimensional Cartesian coordinate system.

18. The method as claimed in claim 15, wherein a speed or a torque of the at least one motor is predetermined by the travel profile, and wherein it is predetermined by the travel profile at which point in time or at which position of the drive shaft, which torque or which speed is implemented by the motor at the drive shaft.

* * * * *